United States Patent [19]
Frangioni et al.

[11] 3,938,982
[45] Feb. 17, 1976

[54] PROCESS FOR PREPARING LIQUID FERTILIZERS

[75] Inventors: Alessandro Frangioni, Mogliano Veneto (Treviso); Giovanni Venturino; Giorgio Morandi, both of Mestre (Venice); Adriano Del Vesco, Mantova, all of Italy

[73] Assignee: Montecatini Edison S.p.A., Milan, Italy

[22] Filed: July 27, 1973

[21] Appl. No.: 383,113

[30] Foreign Application Priority Data
July 28, 1972  Italy.................................. 27589/72

[52] U.S. Cl. ......................... 71/34; 71/43; 423/305
[51] Int. Cl.² ..................... C05B 7/00; C01B 25/26
[58] Field of Search ........ 71/34, 64 C, 43; 423/305, 423/314, 315

[56] References Cited
UNITED STATES PATENTS

| | | | |
|---|---|---|---|
| 2,792,286 | 5/1957 | Wordie et al. | 71/41 X |
| 3,109,729 | 11/1963 | Slack et al. | 71/64 C X |
| 3,113,858 | 12/1963 | Slack et al. | 71/64 C |
| 3,179,496 | 4/1965 | Skinner et al. | 71/34 X |
| 3,199,973 | 8/1965 | Moore | 71/43 |
| 3,264,087 | 8/1966 | Slack et al. | 71/43 |
| 3,382,059 | 5/1968 | Getsizer | 71/34 |
| 3,813,233 | 5/1974 | Kendrick, Jr. | 71/34 |

*Primary Examiner*—Charles N. Hart
*Assistant Examiner*—Ferris H. Lander

[57] ABSTRACT

Improved stable suspension liquid fertilizers based on ammonia and phosphoric acid obtained by the wet method, and combining both a high content of fertilizing elements and a long storage life are prepared by ammoniating the phosphoric acid with gaseous ammonia in two steps at a temperature of from 90°C to 120°C until a pH of between 6 and 8 is attained, rapidly cooling the resulting ammonium phosphate suspension to a temperature of from 0°C to 35°C, and during the cooling adding a suspending agent to the suspension while maintaining the suspension under stirring.

8 Claims, No Drawings

PROCESS FOR PREPARING LIQUID FERTILIZERS

THE PRIOR ART

Suspension liquid fertilizers are saturated aqueous solutions of fertilizing substances which comprise small crystals of the fertilizing substances in suspension.

The suspension liquid fertilizers have important advantages over conventional solid fertilizers. They do not give rise to caking problems and, being fluid, are readily applied to the soil. Thus, the suspension liquid fertilizers can be pumped through suitable pipes and directly sprayed on the soil through nozzles.

However, use of the suspension liquid fertilizers available heretofore has had some drawbacks.

First of all, the suspensions tend to decant during storage, a problem which is attenuated by the presence of certain suspending agents therein, such as, for instance, some types of clays which have been mixed with the suspension in amounts up to 5% by weight based on the total weight of the suspension. While the presence of the suspending agent prolongs the life of the suspension, it does not permit storage of the suspension for an indefinite period of time inasmuch as, with the passing of time, the suspension decants and it becomes necessary to subject the fertilizer to ever more frequent stirrings to keep the crystals in suspension.

Another drawback of the prior art suspension fertilizers is that crystals grow during storage, with the formation of large crystals, and considerable trouble is encountered during the feedings of the fertilizers into pipes and spraying thereof through spray-nozzles, due to clogging of the pipes, pumps and in particular the nozzles.

The requirements for a good suspension liquid fertilizer, therefore, are a low rate of sedimentation, a low rate of crystal growth, and a low viscosity, all of which facilitate handling of the suspension and periodical stirring thereof during storage.

At the same time, the content of fertilizing elements in the suspension must be high.

It is very difficult to arrive at a suspension liquid fertilizer which has all of the desirable properties because the attainment of one essential property can require sacrifice of another. For example, the sedimentation rate may be reduced by increasing the viscosity of the liquid, which object is obtained, for instance, by increasing the quantity of suspending agent or of suspended solids therein. However, increase in the quantity of suspending agent increases the cost of the product, while increase in the suspended solids content — and thus the quantity of fertilizing elements in the suspension — has the effect of promoting growth of the crystals.

Other difficulties are met in the preparation of the suspension liquid fertilizers by ammoniation of phosphoric acid obtained by the wet process due to the impurities present in the acid, which impurities precipitate during the ammoniation. It is known, in fact, that in general the acid contains from 3% to 6% by weight of impurities of varying kinds and in varying quantities depending on the type of phosphorite used and on the conditions of the wet process by which the phosphoric acid is obtained. Thus, if the phosphorite is treated with sulphuric acid, the impurities most frequently found in the phosphoric acid and in largest amount are $Fe_2O_3$; $Al_2O_3$; $MgO$; $SiF_6^=$; $F^-$; $Ca^{++}$; and $SO_4^=$.

During ammoniation of the phosphoric acid, the impurities mentioned precipitate in the form of very fine particles of gel consistency and containing, in particular, iron, aluminum and magnesium phosphates, calcium phosphates and sulphate, silica and sodium and ammonium fluorosilicates. During storage of the suspension, those precipitates form a hard gel which is not easily broken up or removed from the container in which the suspension is stored.

For all of the reasons, the ammonium phosphate suspensions from phosphoric acid obtained by the wet process of the prior art have had a maximum content of fertilizing substances of 40% by weight and a storage life of about a month.

In order to obtain a suspension liquid fertilizer containing more than 40% of fertilizing substances and a storage life longer than one month, it has been necessary to either purify the starting phosphoric acid or to replace it, at least in part, with polyphosphoric acid in order to maintain at least part of the impurities in solution due to the sequestering action of the polyphosphoric ions. Both methods of solving the problem increase, very considerably, the final cost of the suspension liquid fertilizer.

THE PRESENT INVENTION

One object of this invention is to provide a method for preparing suspension liquid fertilizers starting from ammonia and phosphoric acid obtained by the wet process which combine a high titer of fertilizing elements, for instance 50% and more by weight of N and $P_2O_5$, with excellent storage and handling characteristics and without having to resort to the expedients of purifying the phosphoric acid prior to ammoniating it or to the replacement of part of the phosphoric acid with polyphosphoric acid.

Another object was to provide suspension liquid fertilizers having a long storage life of 6 months and longer.

These and other objects as will appear have been achieved by the present invention according to which suspension liquid fertilizers are prepared by a process consisting of the following steps:

1. ammoniating the phosphoric acid obtained by the wet process by treating it with gaseous ammonia, at 90°C to 120°C, until a pH of between 4 and 5 is attained;
2. continuing the ammoniation, at 90°C to 120°C, with gaseous ammonia until a pH between 6 and 8 is attained;
3. rapidly cooling the resulting ammonium phosphate suspension to a temperature of 0°C to 35°C; and adding a suspending agent to the suspension during the cooling step while maintaining the suspension under stirring.

The preparation of the suspension liquid fertilizer can be carried out discontinuously. In that embodiment of the invention, the gaseous ammonia is added to the phosphoric acid under stirring until the indicated pH values are reached.

The preparation of the suspension liquid fertilizer can also be carried out continuously. In that embodiment of the invention, which is presently preferred, the liquid phase and the ammonia are fed to reactors fitted with stirrers in a ratio such that the pH values indicated are maintained.

Particularly good results are achieved when attaining a pH comprised between 4.5 and 5.0 in the first phase, and a pH between 6.5 and 7.0 in the second phase. In both phases the temperature may vary between 90°C and 120°C. Preferably, the temperature is comprised between 105°C and the boiling temperature of the solution, which boiling temperature is, in general, comprised between 110°C and 120°C. The reaction is exothermic and, in general, it is not necessary to supply heat from an external source.

The reaction heat permits the evaporation of considerable quantities of water, thus permitting the obtainment of products having a total titer in N and $P_2O_5$ of, for instance, about 45% by weight, starting from phosphoric acid having a titer of, for instance, about 30% of $P_2O_5$, without having to resort to a preliminary concentration of the acid.

The first ammoniation phase can be carried out in, for instance, 30 to 90 minutes; the second phase in, for instance, 10 to 60 minutes.

The slurry resulting from the second phase must be cooled to between 0°C and 35°C in a time not exceeding 20 minutes. Preferably, the cooling is instantaneous and is easily achieved by continuously feeding the slurry from the second phase and the suspending agent into a suitably cooled third (conditioning) reactor. Cooling of said conditioning reactor can be accomplished by any known method, for instance by continuously feeding part of the suspension from the conditioning reactor to a water cooler and continuously recycling the cooled suspension from the water cooler back to the conditioning reactor.

When the cooling is not instantaneous, the suspending agent may be added to the slurry after the latter has been cooled to a temperature of 60°–70°C or lower.

During conditioning of the slurry with the suspending agent, the slurry must be subjected to heavy stirring which must be such as to insure a peripheral speed of preferably at least 0.55 mt/sec. The definition of the speed indicated and the practical procedures for realizing the same are described in for instance, "Mixing," published by the Academic Press of New York, 1966, at Page 181.

In the practice of the present invention the conditioning under the conditions stated is carried on for, e.g. 30 to 90 minutes.

The suspending agents may be, for example, clays, more particularly montmorillonites and attapulgites, or silica or alumina gels. The suspending agents may be used alone or in admixture. In general, the suspending agents are used in amounts of from 1% to 3% by weight on the total additioned suspension and are added either in the solid state or in the form of a pre-prepared aqueous suspension.

Various other fertilizing substances can be admixed with the suspension, including $NH_4NO_3$ or urea (for increasing the nitrogen titer) and KCl (for providing for ternary fertilizers). In general, such additional fertilizers are added to the cooled suspension after or contemporaneously with the addition of the suspending agent or mixture of suspending agents, and in the form of crystals or granules having, in general, a size not greater than 0.6 mm.

In the process of this invention the phosphoric acid obtained by the wet process does not require purification prior to the ammoniation step. It may be the product of an attack by any acid on phosphorites, for instance $H_2SO_4$; or $H_2SO_4$ plus $(NH_4)_2SO_4$; or $HNO_3$ plus $(NH_4)_2SO_4$ or $K_2SO_4$, etc.

An important feature of the present process is that the high temperature used during the ammoniation results in the volatilization and elimination of part of the impurities such as $F^-$ and $SiO_2$ in the form of $SiF_4$ and HF. The other impurities precipitate in a highly subdivided and non-gelatinous form and thus do not present problems during storage and handling.

Also, the ammonium phosphates precipitate in a highly subdivided form and therefore remain in suspension and give rise to practically no crystal-growing phenomena during storage.

The phosphoric acid can be introduced in varying degrees of concentration and may have $P_2O_5$ titers of, for instance, between 20% and 60% by weight. If it is desired to obtain ammonium phosphates in the absence of other fertilizing substances, it is preferred to use phosphoric acid having a $P_2O_5$ concentration of 30–36% by weight. When other fertilizing substances are to be introduced the $P_2O_5$ titer of the phosphoric acid is preferably comprised between 20% and 30%.

When phosphoric acid having a $P_2O_5$ concentration higher than about 36% is used, it is necessary to cool the reacting mass during the ammoniation, or to dilute the mass with water in order to avoid a product having such a high titer that the solids content will be too high.

By varying the concentration of the starting phosphoric acid and the ammoniation pH of the second phase, it is possible to obtain binary fertilizers having, for example, a titer of 10–14 in N and of 29.5–38 in $P_2O_5$, with a total titer of up to 50 and over.

By adding ammonium nitrate or urea, it is possible to obtain binary fertilizers having, for instance, a titer of 20–20, 15–30, or 24–12.

By adding KCl, it is possible to obtain ternary fertilizers having, for instance, a titer in $N/P_2O_5/K_2O$ of 6-1-6-21; 5-13-25 or 4-10-27. By adding KCl and $NH_4NO_3$ and/or urea, balanced ternary fertilizers having a titer of, for instance, 13-13-13 may be obtained. To these formulations there may also be added nourishing oligoelements and/or pesticides.

The suspension fertilizers obtained by the process of this invention have unusual storage stability characteristics. If, every 2 or 3 days, the fertilizers are subjected to short periods of stirring according to methods used conventionally for suspension fertilizers, the suspensions show a negligible growth of crystals after 4–6 months of storage at room temperature (between 15°C and 25°C), while the fluidity thereof remains substantially unaltered. From the foregoing it follows that the present suspension fertilizers may be stored safely for a far longer time than the usual storage periods (from 1 to 3 months) for fertilizers.

The suspensions obtained by the present process also have good storage properties at 0°C, especially those suspensions having rather low titers in fertilizing substances. Those having a high titer show a certain growth of crystals during storage at 0°C. However, we have found that those crystals dissolve again when the suspensions are brought back to room temperature.

Thus, the liquid suspension fertilizers obtained by the process of this invention have the advantage that they can be stored without trouble at all seasons of the year.

The viscosity of the suspensions at room temperature is generally comprised between 50 and 250 centipoises, depending on the formulation, and the viscosity increases only negligibly with time. The viscosity is about double when the suspensions are stored at 0°C, but remains sufficiently low as not to cause handling problems. On being brought back to room temperature, on the other hand, the suspensions show viscosities which are substantially the same as viscosities of the suspensions stored at room temperature.

The following examples are given to better illustrate the invention and are not intended as limiting.

EXAMPLE 1

The starting phosphoric acid of this example was obtained by sulphuric attack of phosphorite, and showed a titer in $P_2O_5$ of 27% by weight. Its percent by weight content in impurities is as follows:

| | | |
|---|---|---|
| Fe | = | 0.17 |
| Mg | = | 0.25 |
| Al | = | 0.2 |
| $SiO_2$ | = | 0.9 |
| F | = | 1.9 |
| CaO | = | 0.5 |
| $SO_4$ | = | 1.0 |

5,000 g/hr of the phosphoric acid were continuously fed into a 2 liter reactor together with 410 g/hr of gaseous $NH_3$, maintaining the reactor under stirring.

The pH amounted to 4.6–4.7; the temperature was comprised between 105° and 108°C.

The suspension that was coming out of the first reactor was fed, together with 180 g/hr of $NH_3$, to a second 2 liter reactor maintained under stirring. The pH amounted to 6.6–6.7, while the temperature was comprised between 105° and 108°C.

The slurry thereupon passed into a third 2 liter vessel maintained at 20°–22°C and under heavy stirring. Into this vessel there were continuously fed 95 g/hr of solid attapulgite, corresponding to about 2% by weight on the total additioned suspension. The attapulgite showed an active surface of 210 sq.mt/g. The stirring was carried out by means of a 4-blade stirrer running with a peripheral speed of 0.55 m/sec.

The conditioned suspension had a titer of 10.3 in N and 29.4 in $P_2O_5$. At 23°C its density was of 1.374 g/cc and its viscosity amounted to 42 centipoises. At 0°C the viscosity rose to 73 centipoises. Its pH value was equal to 6.7.

Two samples of the suspension were stored at, respectively, room temperature, that is at 15°–25°C, and at 0°C. Every 2–3 days they were subjected to stirring for about 10 minutes according to standard methods.

After 6 months of storing, and three days after the last stirring operation, the volume of clear overlaying liquid amounted to 5–10% of the total while the crystals with a size greater than 20 mesh (Tyler scale) were lower than 0.01% b.w. in both suspensions.

The aperture of 20 mesh corresponds to 0.833 mm while the spraying nozzles for the spraying of the suspensions have in general a diameter of at least 1.2 mm.

After 6 months, the viscosity of the sample stored at room temperature was 55 centipoises while the viscosity of the samples stored at 0°C was 85 centipoises.

EXAMPLES 2 – 5

Examples 2, 3 and 4 concern the production of ammonium phosphates; Example 5 is concerned with the production of a ternary fertilizer obtained by the addition, in the third reaction vessel, of KCl having a titer of 60% in $K_2O$ and with a particle size of below 0.6 mm.

The main operational conditions and characteristics of the products obtained are shown in Table 1. The concentration of the starting $H_3PO_4$, still obtained by the sulphuric phosphorite attack, is different for each product. The nature of the impurities and their content with respect to the $P_2O_5$ are similar to those of Example 1.

As a suspending agent there was used the same attapulgite as in Example 1.

The operational procedures not specifically defined are the same as those of Example 1.

As can be observed from the tabulated data, the storing characteristics of the 4 products are excellent.

TABLE 1

| Ex. | Reaction conditions | | | Starting $H_3PO_4$: | Suspending agent | Titer in N and in |
|---|---|---|---|---|---|---|
| | Temperature °C | pH 1st stage | pH 2nd stage | $P_2O_5$ % | % on total | $P_2O_5$ (°) |
| 2 | 108–112 | 4.6 | 6.8 | 30 | 2 | 11.9–32.6 |
| 3 | 112–116 | 4.8 | 6.7 | 33 | 2 | 12.7–35.4 |
| 4 | 116–120 | 4.7 | 6.6 | 35 | 2 | 13.6–37 |
| 5 | 105–110 | 4.7 | 6.8 | 21 | 2 | 6–16–21 |

(°) and $K_2O$ for Example 5

| Ex. | Chemical-physical characteristics of the suspension | | | | Volume of overlaying clear liquid at room temperature | | Crystals of dimension > 20 mesh at room temperature | | Crystals of dimension > 20 mesh at a temperature of 0°C | |
|---|---|---|---|---|---|---|---|---|---|---|
| | Density of suspension at 23°C g/cc | pH | Viscosity in centipoises | | Duration of storage in days | % | Duration of storage in days | % | Duration of storage in days | % |
| | | | at 23°C | at 0°C | | | | | | |
| 2 | 1.411 | 6.8 | 70 | 146 | 120 | 3–5 | 120 | <0.01 | 21 | <0.01 |
| 3 | 1.432 | 6.7 | 161 | 355 | 120 | 2–3 | 120 | <0.01 | 35 | 4.96(∞) |
| 4 | 1.460 | 6.6 | 220 | 540 | 120 | 0–1 | 120 | <0.01 | 35 | 5.30(∞) |
| 5 | 1.526 | 6.8 | 233 | 455 | 120 | 0–1 | 120 | <0.01 | 30 | <0.01 |

(∞) By bringing the suspension back to a temperature of 23°C, the quantity of crystals having a size greater than 20 mesh becomes less than 0.01%

We claim:

1. A continuous process for the preparation of suspension liquid fertilizers starting from ammonia and phosphoric acid having a $P_2O_5$ concentration not higher than 36% by weight obtained by the wet method, and which fertilizers contain ammonium phosphate in suspension, said process comprising the following steps:

1. ammoniating the phosphoric acid with gaseous ammonia until a pH comprised between 4 and 5 is attained, said ammoniating step being carried out at temperatures comprised between 105°C and the boiling temperature of the resulting suspension and for a time of from 30 to 90 minutes;
2. continuing the ammoniation with gaseous ammonia until the pH of the suspension is comprised between 6 and 8, this second ammoniation step carried out at temperatures comprised between 105°C and the boiling temperature of the suspension; and
3. rapidly cooling the ammonium phosphate suspension thus obtained to a temperature comprised between 0°C and 35°C and during the cooling adding a suspending agent while maintaining the suspension under stirring.

2. The process according to claim 1, wherein the pH attained in Step 1 is comprised between 4.5 and 5.0.

3. The process according to claim 1, wherein the pH attained in Step 2 is comprised between 6.5 and 7.0.

4. The process according to claim 1, wherein the suspending agent is a clay.

5. The process according to claim 4, wherein the clay is selected from the group consisting of montmorillonites and attapulgites.

6. The process according to claim 1, wherein the suspending agent is selected from the group consisting of silica and alumina gels.

7. The process according to claim 1, wherein the quantity of suspending agent is comprised between 1% and 3% by weight on the total additioned suspension.

8. The process according to claim 1, wherein other nitrogenous and/or potassium fertilizing substances are admixed with the suspension.

* * * * *